United States Patent
Gregoire et al.

(10) Patent No.: US 10,114,428 B1
(45) Date of Patent: Oct. 30, 2018

(54) IT DEVICE

(71) Applicant: EMC Corporation, Hopkinton, MA (US)

(72) Inventors: Michael Gregoire, Waltham, MA (US); Robert P. Wierzbicki, Worcester, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 114 days.

(21) Appl. No.: 14/229,049

(22) Filed: Mar. 28, 2014

(51) Int. Cl.
G06F 1/18 (2006.01)
G06F 13/38 (2006.01)

(52) U.S. Cl.
CPC ............ G06F 1/186 (2013.01); G06F 13/382 (2013.01); G06F 13/385 (2013.01); G06F 13/387 (2013.01)

(58) Field of Classification Search
CPC ...... G06F 1/185; G06F 1/186; G06F 13/4068; G06F 13/382; G06F 13/385; G06F 13/387; H05K 1/117
USPC .... 361/803, 785, 796, 788, 736, 784, 679.4; 439/65, 79, 346; 710/301
See application file for complete search history.

(56) References Cited

U.S. PATENT DOCUMENTS

| | | | |
|---|---|---|---|
| 5,410,717 A * | 4/1995 | Floro | G06Q 20/346 710/104 |
| 6,363,505 B1 | 3/2002 | Vest et al. | |
| 7,440,293 B2 * | 10/2008 | Hood et al. | 361/810 |
| 7,711,886 B2 | 5/2010 | Foster, Sr. | |
| 9,230,112 B1 | 1/2016 | Peterson et al. | |
| 2002/0141170 A1 * | 10/2002 | Rhoads | 361/796 |
| 2004/0158665 A1 * | 8/2004 | Morrow | G06F 13/409 710/301 |
| 2006/0158864 A1 * | 7/2006 | Gay | 361/785 |
| 2006/0252285 A1 * | 11/2006 | Shen | 439/43 |
| 2007/0276981 A1 | 11/2007 | Atherton et al. | |
| 2008/0059678 A1 * | 3/2008 | Jian | 710/301 |
| 2011/0250766 A1 * | 10/2011 | Chiu et al. | 439/65 |
| 2012/0311220 A1 | 12/2012 | Goldenberg et al. | |
| 2013/0024591 A1 * | 1/2013 | Sun | 710/301 |
| 2013/0178112 A1 * | 7/2013 | Su et al. | 439/660 |

OTHER PUBLICATIONS

Non-Final Office Action issued in related U.S. Appl. No. 14/299,222 dated Aug. 26, 2016.
Final Office Action issued in related U.S. Appl. No. 14/229,222 dated Dec. 21, 2016.
Non-Final Office Action issued in U.S. Appl. No. 14/229,222 dated Jun. 23, 2017.
Final Office Action dated Oct. 26, 2017 in related U.S. Appl. No. 14/229,222.
Non-Final Office Action issued in U.S. Appl. No. 14/299,222 dated Mar. 20, 2018.
Final Office Action issued in U.S. Appl. No. 14/299,222 dated Sep. 12, 2018.

* cited by examiner

Primary Examiner — Dimary Lopez Cruz
Assistant Examiner — Abhishek Rathod
(74) Attorney, Agent, or Firm — Mark H. Whittenberger; Heath M. Sargeant; Holland & Knight LLP

(57) ABSTRACT

An IT device includes a system board and a hybrid connector system including a standard connector portion and a supplemental connector portion. The standard connector portion is configured to receive a standardized expansion card and a combination of the standard connector portion and the supplemental connector portion is configured to receive a riser card.

16 Claims, 4 Drawing Sheets (top view)

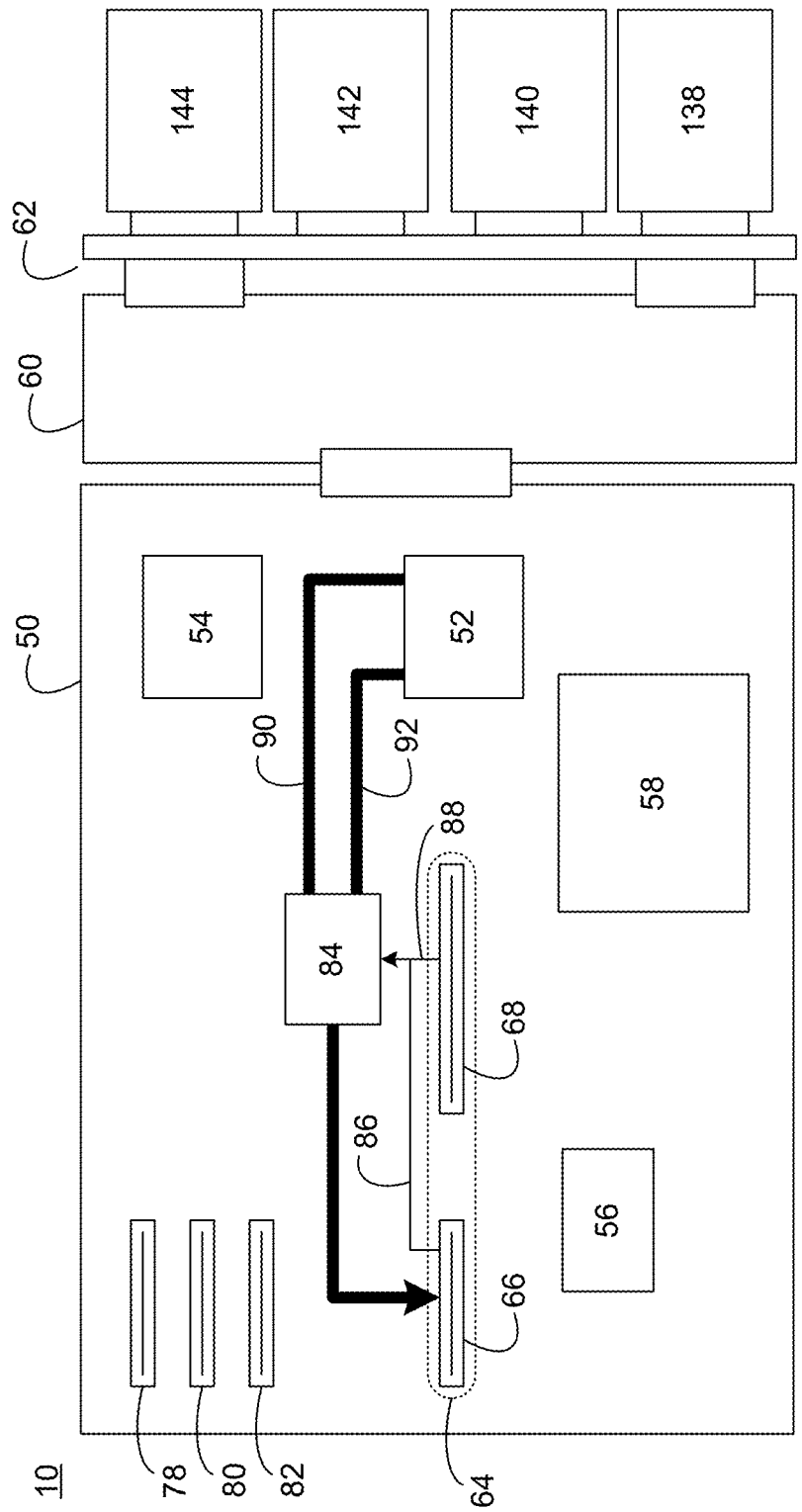
FIG. 2A (top view)

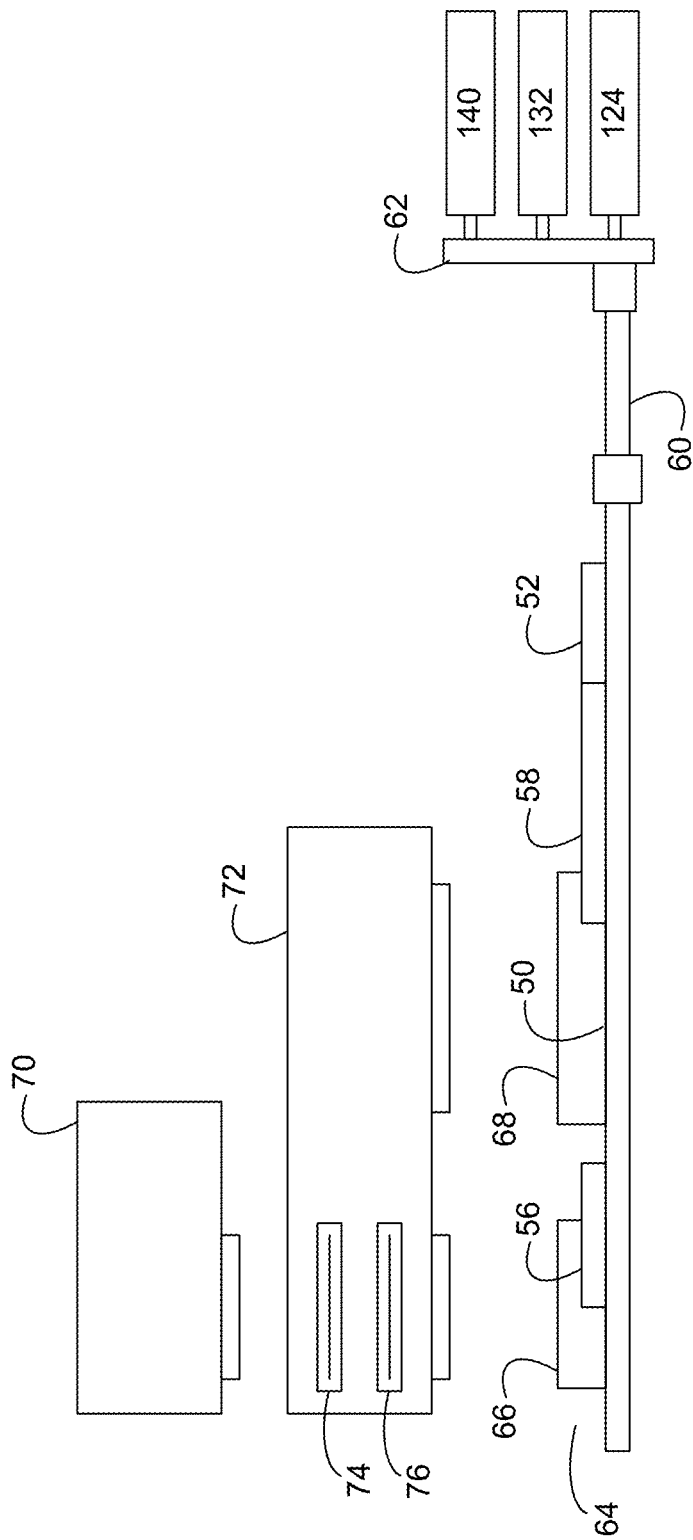
FIG. 2B (side view)

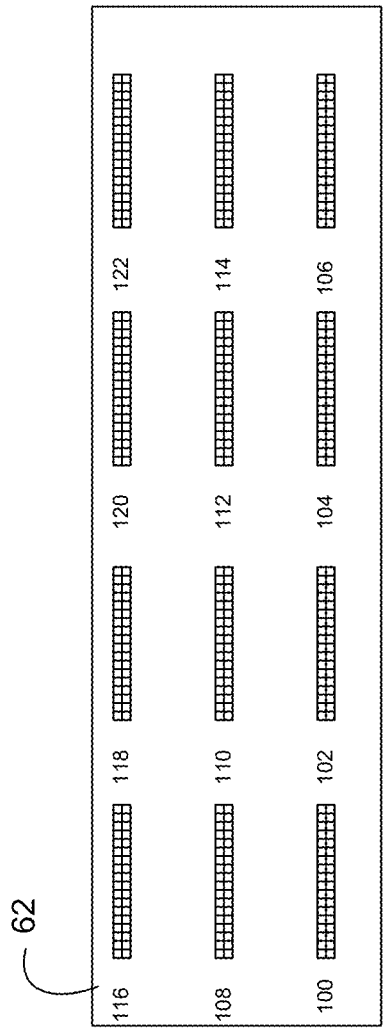
FIG. 2C (front view)
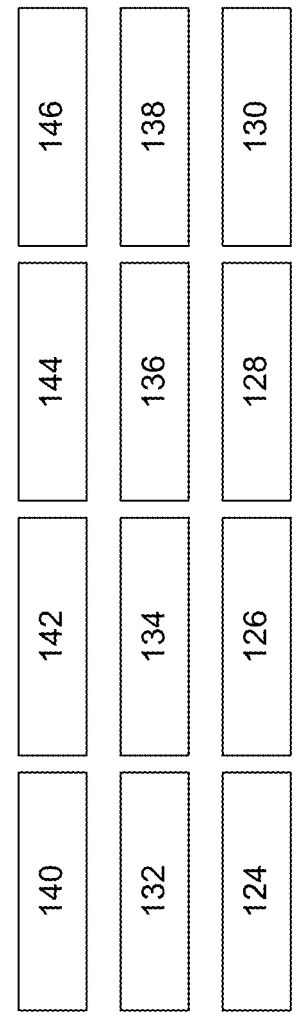
FIG. 2D (front view)

US 10,114,428 B1

IT DEVICE

TECHNICAL FIELD

This disclosure relates to system boards and, more particularly, to configurable system boards for use in high availability devices.

BACKGROUND

In today's IT infrastructure, high availability is of paramount importance. Specifically, critical (and sometimes non-critical) components within an IT infrastructure are often layered in redundancy. For example, primary servers may be supported by backup servers; primary switches may be supported by backup switches; primary power supplies may be supported by backup power supplies; and primary storage systems may be supported by backup storage systems.

When designing such high availability devices, flexibility concerning the manner in which these devices are configured is highly important. Further, since enclosure space within these devices is at a premium, such configuration flexibility should be accompanied by spatial efficiency.

SUMMARY OF DISCLOSURE

In one implementation, an IT device includes a system board and a hybrid connector system including a standard connector portion and a supplemental connector portion. The standard connector portion is configured to receive a standardized expansion card and a combination of the standard connector portion and the supplemental connector portion is configured to receive a riser card.

One or more of the following features may be included. The standardized expansion card may be a PCIe expansion card. The riser card may include one or more expansion slots, each of which may be configured to receive a supplemental expansion card. Each of the supplemental expansion cards may be a PCIe expansion card.

The standard connector portion may include connectors for one or more signals specific to the standardized expansion card. The supplemental connector portion may include connectors for one or more signals specific to the riser card. A controller assembly may be electrically coupled to the system board and may be configured to determine whether the riser card is inserted into the hybrid connector system. The controller assembly may be further configured to monitor the signals present on the connectors included within the standard connector portion and/or the supplemental connector portion of the hybrid connector system to determine whether the riser card is inserted into the hybrid connector system.

In another implementation, a system board includes a hybrid connector system including a standard connector portion and a supplemental connector portion. The standard connector portion is configured to receive a standardized expansion card and a combination of the standard connector portion and the supplemental connector portion is configured to receive a riser card.

One or more of the following features may be included. The standardized expansion card may be a PCIe expansion card. The riser card may include one or more expansion slots, each of which may be configured to receive a supplemental expansion card. Each of the supplemental expansion cards may be a PCIe expansion card.

The standard connector portion may include connectors for one or more signals specific to the standardized expansion card. The supplemental connector portion may include connectors for one or more signals specific to the riser card. A controller assembly may be electrically coupled to the system board and may be configured to determine whether the riser card is inserted into the hybrid connector system. The controller assembly may be further configured to monitor the signals present on the connectors included within the standard connector portion and/or the supplemental connector portion of the hybrid connector system to determine whether the riser card is inserted into the hybrid connector system.

In another implementation, a system board includes a hybrid connector system including a standard connector portion having connectors for one or more signals specific to a standardized expansion card and a supplemental connector portion having connectors for one or more signals specific to a riser card. The standard connector portion is configured to receive the standardized expansion card and a combination of the standard connector portion and the supplemental connector portion is configured to receive the riser card.

One or more of the following features may be included. The standardized expansion card may be a PCIe expansion card. The riser card may include one or more expansion slots, each of which may be configured to receive a supplemental expansion card. Each of the supplemental expansion cards may be a PCIe expansion card.

The details of one or more implementations are set forth in the accompanying drawings and the description below. Other features and advantages will become apparent from the description, the drawings, and the claims.

BRIEF DESCRIPTION OF THE DRAWINGS

FIGS. 2A & 2B are diagrammatic views of a system board, drive controller system, and mid-plane assembly included within the IT device of FIG. 1;

FIG. 2C is a diagrammatic view of the mid-plane assembly of FIGS. 2A & 2B; and

FIG. 2D is a diagrammatic view of a drive array for electrically coupling to the mid-plane assembly of FIGS. 2A, 2B & 2C.

Like reference symbols in the various drawings indicate like elements.

DETAILED DESCRIPTION OF THE PREFERRED EMBODIMENTS

Figure 1:
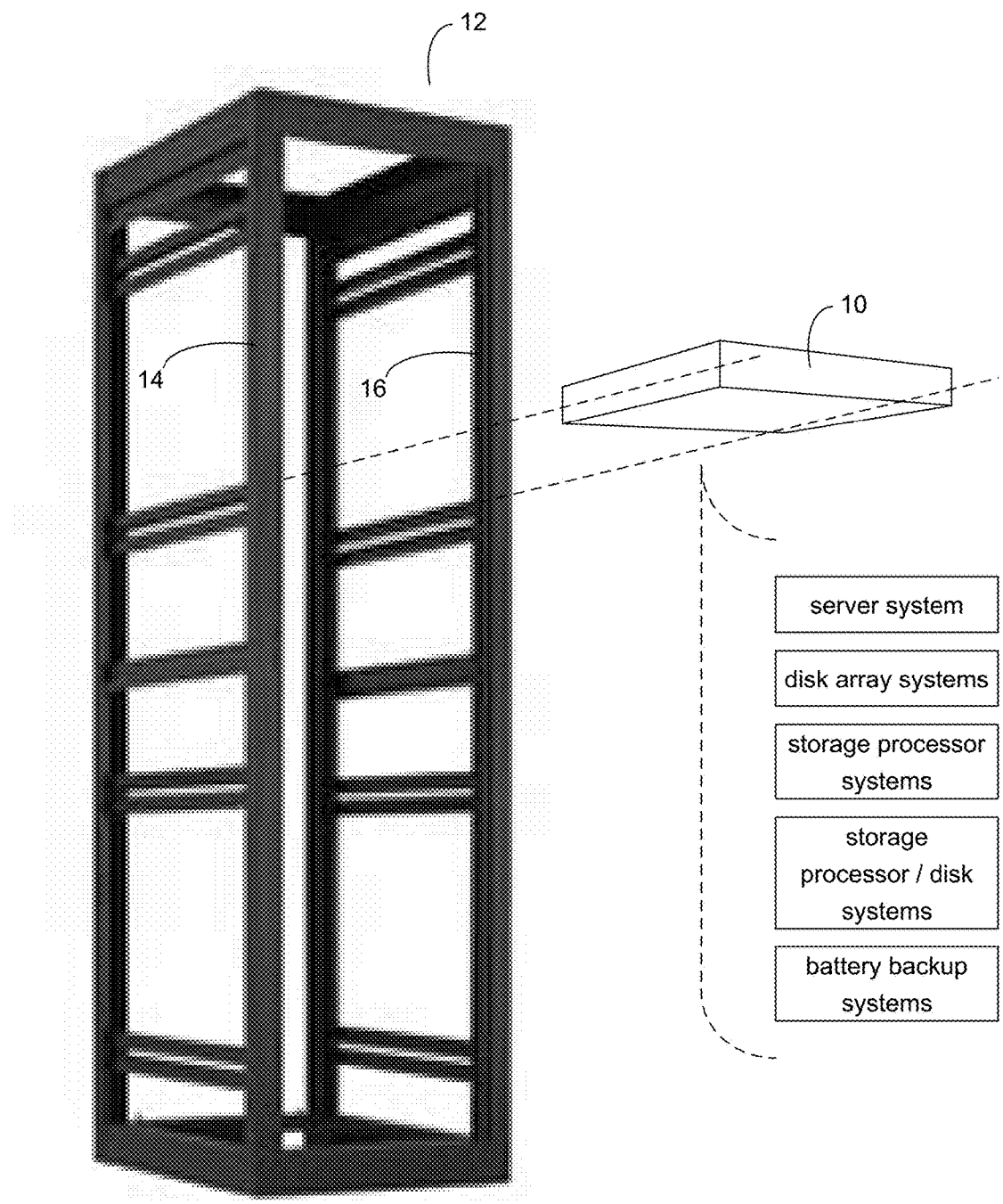
FIG. 1 is a perspective view of an IT rack and an IT device.

Referring to FIG. 1, IT devices (e.g., IT device 10) may be utilized by organizations to process and store data. Examples of IT device 10 may include but are not limited to the various components of high-availability storage systems, such as: server systems, disk array systems, storage processor systems, storage processor/disk systems, and battery backup systems.

IT racks (e.g., IT rack 12) may be utilized to store and organize these IT devices (e.g., IT device 10). For example, IT rack 12 may be placed within a computer room and various IT devices may be attached to rails (e.g., NEMA rails 14, 16) included within IT rack 12, wherein these rails (e.g., NEMA rails 14, 16) may have a standard and defined spacing between them (e.g., 19"). Typically, IT devices that are configured to fit within IT rack 12 may be described as rack-mountable IT devices. Alternatively. IT device 10 may be a free-standing device that does not require an IT rack for mounting.

Referring also to FIGS. 2A, 2B, 2C & 2D, positioned within IT device 10 may be one or more system boards (e.g., system board 50) that may include a plurality of circuits 52, 54, 56, 58, examples of which may include but are not limited to one or more microprocessors, memory circuits, voltage regulator circuits, and memory controller circuits.

IT device 10 may include a drive controller system (e.g., drive controller system 60) that may be electrically coupled to system board 50. A mid-plane assembly (e.g., mid-plane assembly 62) may be electrically coupled to drive controller system 60. Mid-plane assembly 62 may include a plurality of drive connectors (e.g., drive connectors 100, 102, 104, 106, 108, 110, 112, 114, 116, 118, 120, 122) that are configured to electrically couple mid-plane assembly 62 to a plurality of disk drives (e.g., disk drives 124, 126, 128, 130, 132, 134, 136, 138, 140, 142, 144, 146 respectively), Disk drives 124, 126, 128, 130, 132, 134, 136, 138, 140, 142, 144, 146 may be hot-swappable disk drives that may be coupled to and/or decoupled from mid-plane assembly 62 during the operation of IT device 10. While, in this example, mid-plane assembly 62 is shown to accommodate twelve disk drives, this is for illustrative purposes only, as the actual number of disk drives may be increased/decreased based upon design criteria.

IT device 10 may further include a hybrid connector system (e.g., hybrid connector system 64) electrically coupled to system board 50. Hybrid connector system 64 may include a standard connector portion (e.g., standard connector portion 66) and a supplemental connector portion (e.g., supplemental connector portion 68). Standard connector portion 66 may be configured to receive a standardized expansion card (e.g., standardized expansion card 70) and a combination of standard connector portion 66 and supplemental connector portion 68 may be configured to receive a riser card (e.g., riser card 72).

Standard connector portion 66 may include connectors (not shown) for one or more signals specific to standardized expansion card 70, wherein supplemental connector portion 68 may include connectors (not shown) for one or more signals specific to riser card 72.

An example of standardized expansion card 70 may include, but is not limited to, a PCI Express (PCIe) expansion card. Riser card 72 may be configured to include one or more expansion slots (e.g., PCIe expansion card slots 74, 76). Riser card 72 may be an optional card for IT device 10 that may be configured to allow for the utilization of supplemental expansion cards (e.g., PCIe expansion card slots 74, 76) within IT device 10.

As discussed above, IT device 10 may include one or more system boards (e.g., system board 50) that may include a plurality of circuits 52, 54, 56, 58, wherein examples of these circuits may include but are not limited to one or more microprocessors, memory circuits, voltage regulator circuits, and memory controller circuits. System board 50 may further include one or more expansion slots (e.g., expansion card slots 78, 80, 82) that are electrically coupled to system board 50 and may each be configured to receive an expansion card (such as expansion card 70). While in this particular example, system board 50 is shown to include three expansion slots (e.g., expansion slots 78, 80, 82), this is for illustrative purposes only and is not intended to be a limitation of this disclosure, as other configuration are possible. For example, system board 50 may include zero expansion slots.

IT device 10 may include a controller assembly (e.g., controller assembly 84) electrically coupled to system board 50 and configured to determine whether an expansion card (e.g., standardized expansion card 70) or a riser card (e.g., riser card 72) is inserted into hybrid connector system 64. Specifically, controller assembly 84 may be configured to monitor one or more signals (e.g., signals 86, 88) present on the connectors (not shown) included within standard connector portion 66 and/or supplemental connector portion 68 of hybrid connector system 64 to determine whether a riser card (e.g., riser card 72) is inserted into hybrid connector system 64. For example, one or more of signals 86, 88 may be pulled to ground whenever riser card 72 is inserted into hybrid connector system 64.

Accordingly, controller assembly 84 may be configured to monitor one of more signals present within hybrid connector system 64 to determine whether hybrid connector system 64 should be configured to function with standardized expansion card 70 or riser card 72. As discussed above, standard connector portion 66 may be configured as a standard PCIe expansion slot and may include connectors (not shown) for one or more signals specific to standardized expansion card 70. Accordingly, standardized expansion card 70 may be insertable into and usable within standard connector portion 66 of hybrid connector system 64, providing (in this example) a fourth expansion slot (i.e., in addition to expansion slots 78, 80, 82). Further and as discussed above, supplemental connector portion 68 may include connectors (not shown) for one or more signals specific to riser card 72. Accordingly, riser card 72 may be insertable into and usable within the combination of supplemental connector portion 68 and standard connector portion 66.

Additionally, controller assembly 84 may be configured to provide one or more PCIe-based signals (e.g., signals 90) to hybrid connector system 64 whenever standardized expansion card 70 is installed in hybrid connector system 64, wherein controller assembly 84 may be configured to not provide these PCIe-based signals (e.g., signals 90) from hybrid connector system 64 whenever riser card 72 is installed in hybrid connector system 64 (i.e., standardized expansion card 70 is not installed in hybrid connector system 64).

Specifically, controller assembly 84 may be configured to provide these PCIe-based signals (e.g., signals 90) to the connectors (not shown) included within standard connector portion 66 that (as discussed above) provide one or more signals specific to standardized expansion card 70 whenever standardized expansion card 70 is installed in hybrid connector system 64. Conversely, controller assembly 84 may be configured to not provide these PCIe-based signals (e.g., signals 90) from the connectors (not shown) included within standard connector portion 66 that (as discussed above) provide one or more signals specific to standardized expansion card 70 when riser card 72 is installed in hybrid connector system 64.

For example and as is known in the art, PCIe expansion cards (e.g., expansion card 70) and the expansion slots into which they are inserted (e.g., standard connector portion 66 of hybrid connector system 64) include one or more JTAG connectors (as required by the PCIe standard), which may be used for onboard diagnostic purposes. Accordingly and in the event that riser card 72 is inserted into hybrid connector system 64, these JTAG connectors are not needed/used, resulting in wasted connectors. Accordingly, controller assembly 84 may be configured to provide the appropriate diagnostic signals (e.g., signals 90) to the appropriate connectors (not shown) included within standard connector portion 66 only when standardized expansion card 70 is installed in hybrid connector system 64.

In the event that standardized expansion card 70 is not installed in hybrid connector system 64 (e.g., riser card 72 is installed in hybrid connector system 64), signals 90 (i.e., the JTAG diagnostic signals) may not be provided to the connectors (not shown) included within standard connector portion 66 and other signals (e.g., signals 92) may be provided to these connectors (not shown) included within standard connector portion 66. For example, signals 92 may be useable by riser card 72. Further, since signals 92 may be provided to riser card 72 using connectors that (in this example) were designed to provide JTAG diagnostic signals that are only useable by standardized expansion car 70 (which, in this example, is not installed), these connectors may be repurposed to provide e.g., signals 92 and signal density may be enhanced within hybrid connector system 64.

As is known in the art, the PCIe standard provides "Hot Plug" functionality, thus allowing compatible PCIe devices to be inserted/removed without powering down the system (e.g., IT device 10). In order to detect such insertions/removals, the system (e.g., IT device 10) may monitor certain signals present within e.g., the various expansion card slots (e.g., expansion card slots 66, 74, 76, 78, 80, 82). Accordingly, the above-described system generally (and hybrid connector system 64/controller assembly 84 specifically) may be configured to properly interface with such "Hot Plug" functionality.

Having thus described the disclosure of the present application in detail and by reference to embodiments thereof, it will be apparent that modifications and variations are possible without departing from the scope of the disclosure defined in the appended claims.

What is claimed is:

1. An IT device comprising:
    a system board;
    a hybrid connector system including:
        a standard connector including connectors for one or more signals specific to a standardized expansion card, wherein the connectors for one or more signals specific to a standardized expansion card include one or more diagnostic signal connectors for one or more diagnostic signals specific to the standardized expansion card, and
        a supplemental connector;
        wherein the standard connector is configured to receive a standardized expansion card, and a combination of the standard connector and the supplemental connector is configured to receive a riser card; and
    a controller assembly electrically coupled to the system board and configured to:
        provide one or more diagnostic signals specific to the standardized expansion card on the one or more diagnostic signal connectors of the standard connector when one or more signals present on both the standard connector and the supplemental connector are not pulled to ground;
        provide one or more signals specific to the riser card on the one or more diagnostic signal connectors of the standard connector when one or more signals present on both the standard connector and the supplemental connector are pulled to ground.

2. The IT device of claim 1 wherein the standardized expansion card is a PCIe expansion card.

3. The IT device of claim 1 wherein the riser card includes one or more expansion slots, each of which is configured to receive a supplemental expansion card.

4. The IT device of claim 3 wherein each of the supplemental expansion cards is a PCIe expansion card.

5. The IT device of claim 1 wherein the supplemental connector includes connectors for one or more signals specific to the riser card.

6. The IT device of claim 1 wherein the controller assembly is further configured to monitor the signals present on the connectors included within the standard connector and/or the supplemental connector of the hybrid connector system to determine whether the riser card is inserted into the hybrid connector system.

7. A system board comprising:
    a hybrid connector system including:
        a standard connector including connectors for one or more signals specific to a standardized expansion card, wherein the connectors for one or more signals specific to a standardized expansion card include one or more diagnostic signal connectors for one or more diagnostic signals specific to the standardized expansion card, and
        a supplemental connector;
        wherein the standard connector is configured to receive a standardized expansion card, and a combination of the standard connector and the supplemental connector is configured to a riser card; and
    a controller assembly electrically coupled to the system board and configured to:
        provide one or more diagnostic signals specific to the standardized expansion card on the one or more diagnostic signal connectors of the standard connector when one or more signals present on both the standard connector and the supplemental connector are not pulled to ground;
        provide one or more signals specific to the riser card on the one or more diagnostic signal connectors of the standard connector when one or more signals present on both the standard connector and the supplemental connector are pulled to ground.

8. The system board of claim 7 wherein the standardized expansion card is a PCIe expansion card.

9. The system board of claim 7 wherein the riser card includes one or more expansion slots, each of which is configured to receive a supplemental expansion card.

10. The system board of claim 9 wherein each of the supplemental expansion cards is a PCIe expansion card.

11. The system board of claim 7 wherein the supplemental connector includes connectors for one or more signals specific to the riser card.

12. The system board of claim 7 wherein the controller assembly is further configured to monitor the signals present on the connectors included within the standard connector and/or the supplemental connector of the hybrid connector system to determine whether the riser card is inserted into the hybrid connector system.

13. A system board comprising:
    a hybrid connector system including:
        a standard connector including connectors for one or more signals specific to a standardized expansion card, wherein the connectors for one or more signals specific to a standardized expansion card include one or more diagnostic signal connectors for one or more diagnostic signals specific to the standardized expansion card, and a supplemental connector including connectors for one or more signals specific to a riser card;

wherein the standard connector is configured to receive the standardized expansion card, and a combination of the standard connector and the supplemental connector is configured to receive the riser card; and a controller assembly electrically coupled to the system board and configured to:

provide one or more diagnostic signals specific to the standardized expansion card on the one or more diagnostic signal connectors of the standard connector when one or more signals present on both the standard connector and the supplemental connector are not pulled to ground;

provide one or more signals specific to the riser card on the one or more diagnostic signal connectors of the standard connector when one or more signals present on both the standard connector and the supplemental connector are pulled to ground.

14. The system board of claim 13 wherein the standardized expansion card is a PCIe expansion card.

15. The system board of claim 13 wherein the riser card includes one or more expansion slots, each of which is configured to receive a supplemental expansion card.

16. The system board of claim 15 wherein each of the supplemental expansion cards is a PCIe expansion card.

* * * * *